March 11, 1930.  E. J. BLAKE  1,750,156

ELECTRICAL SYSTEM OF DISTRIBUTION

Filed Oct. 20, 1924

Inventor
Eli J. Blake
By his Attorneys
Ward, Crosby & Smith

Patented Mar. 11, 1930

1,750,156

UNITED STATES PATENT OFFICE

ELI J. BLAKE, OF BUFFALO, NEW YORK, ASSIGNOR, BY MESNE ASSIGNMENTS, TO SIMPLEX EQUIPMENT COMPANY, INC., OF NEW YORK, N. Y., A CORPORATION OF DELAWARE

ELECTRICAL SYSTEM OF DISTRIBUTION

Application filed October 20, 1924. Serial No. 744,684.

My invention relates to improvements in electrical systems of distribution and more particularly to electrical systems of distribution wherein the generator is adapted to be connected to a storage battery to charge the same. The main object of the invention is to provide an improved arrangement for connecting and disconnecting the generator to and from the battery. A lamp or other work circuit may also be connected to the battery and generator if desired.

Further and more specific objects, features and advantages will more clearly appear from the detail description given below taken in connection with the accompanying sheet of drawings, which form a part of this specification.

Figure 1:
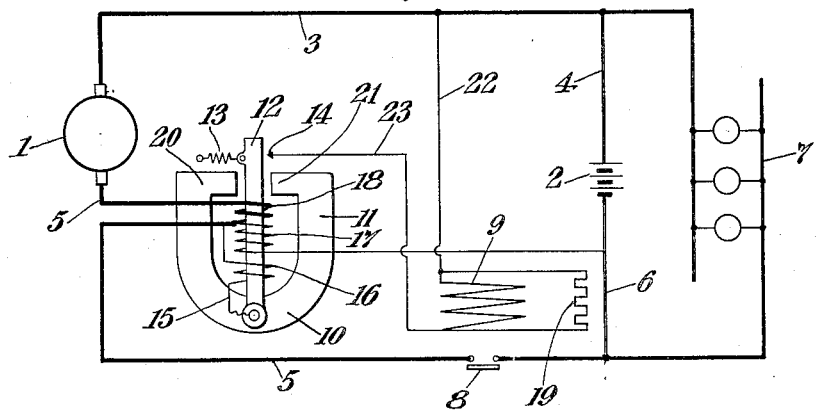
Figure 2:
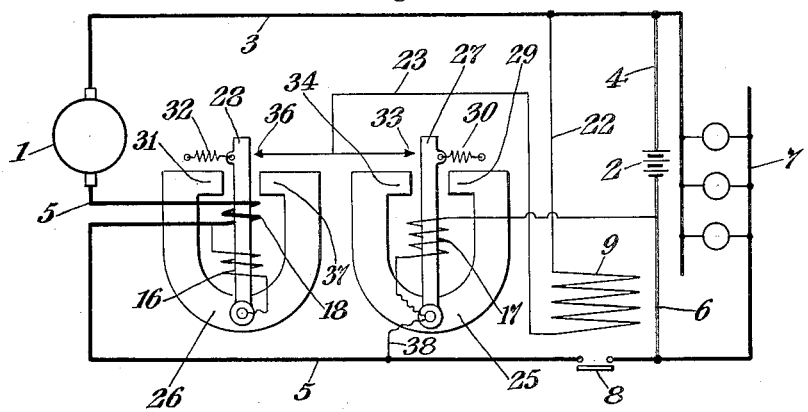
Figure 3:
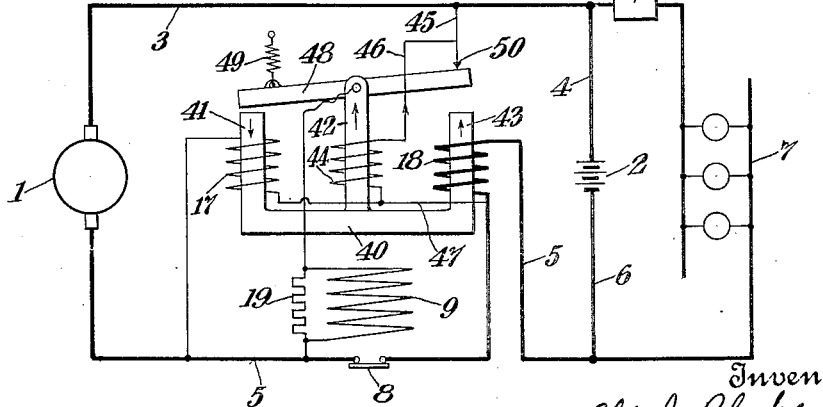

In the drawings Fig. 1 is a diagram illustrating a system embodying one form of my improvements. Fig. 2 is a diagram illustrating a modification and Fig. 3 is another diagram illustrating a still further modification.

Referring to Fig. 1, 1 represents a generator, one terminal of which is connected to the storage battery at 2 through conductor leads 3 and 4. The other terminal of the generator is connected to the other terminal of the battery through conducting leads 5 and 6. 7 represents a lamp or other work circuit connected across the battery and generator. 8 represents a main automatic switch in series between the generator and battery and adapted to be closed upon energization of an electro magnet or an electro-responsive coil 9. 10 represents a polarized relay comprising a permanent horseshoe magnet 11 carrying an armature 12 pivoted thereto, which armature is adapted to be retracted in one direction by spring 13. 14 represents a fixed electrical contact adapted to make electrical contact with the armature 12 which is electrically connected through wire 15 and coil 16 to one side of the generator. The coil 16 is wound around the armature 12 and there is also wound around the armature 12 a coil 17 which is connected in series relation between the generator and battery and in shunt relation to the main switch 8. The coils 16 and 17 are so-called fine wire coils.

Also wound about the armature 12 is a coil 18 connected in series relation between the generator 1 and battery 2 and also in series with the main switch 8. 19 represents a field discharge resistance connected in shunt around the coil 9.

With the generator at rest or running at a speed such that its voltage is below that of the battery voltage, the battery will discharge a small current through coil 17 of the generator in a direction to cause the coil 17 to magnetize the armature 12 so that it will be attracted to the pole 20 of the magnet 11. Under these conditions the circuit through coils 9 and 16 will be deenergized thereby permitting the main switch 8 to remain open. The series coil 18 will also be substantially deenergized although a small current will pass therethrough from the battery in a direction to aid the coil 17. When, however, the generator obtains a speed such that its voltage is slightly greater than that of the battery 2 whereby the generator sends a small predetermined current through the coils 18 and 17 into the battery, the coils 17 and 18 are energized in the reverse direction causing the armature 12 to be drawn to the pole 21, against the action of spring 13, whereby the armature 12 will contact with contact 14 and so cause the coil 9 to be energized and the main switch 8 to be closed, the circuit through coil 9 being from the one side of the generator and battery through conductor 3, conductor 22, coil 9, conductor 23, contact 14, armature 12, wire 15, coils 16 and 18 back to the other side of the generator and battery. This for the first time energizes coil 16 and the current therein acts in a direction to aid the coil 17 and 18 in maintaining the relay switch armature 12 in contact with contact 14. Also as soon as the main switch becomes closed a substantial charging current will pass from the generator to the battery through coil 18 in a direction to further aid in maintaining the polarized relay switch closed. When the main switch is closed the coil 17 is substantially short-circuited and deenergized but the relay switch 12, 14 is maintained closed by the action of coils 16 and 18. Should for any reason the generator voltage drop below that of the battery to a point where a predetermined current flows from the battery through the coil 18 and generator in the opposite direction, then the magnetization of the armature 12 becomes such that it is attracted to the pole 20 of the permanent magnet 11 whereby the circuit through coil 9 is opened and the main switch 8 is opened. This also opens the circuit through coil 16, but the opening of the main switch again permits battery discharge current to flow through coil 17 which tends to maintain the relay switch open until the generator voltage is of such value as to again send a predetermined current through coils 17 and 18 to the battery. It will thus be seen that the generator voltage must exceed the battery voltage slightly before the main switch 8 will be closed and once being closed the generator voltage must drop below the battery voltage to a predetermined extent before the main switch 8 will be opened; and this is accomplished in a simple and efficient manner.

Referring to Fig. 2 the parts there shown are substantially the same as in Fig. 1 except for the relay switch apparatus. Instead of placing the coils 16, 17 and 18 all on one relay switch, two relay switches are provided having permanent magnets 25 and 26 respectively with pivoted armatures 27 and 28 respectively. The armature 27 being pivoted to the magnet 25 and being pulled toward the pole 29 thereof by spring 30, while the armature 28 is pivoted to the magnet 26 and is pulled toward the pole 31 thereof by spring 32. 33 represents a fixed contact adapted to make contact with the armature 27, when the armature 27 is attracted toward the pole 34 of the magnet 25 and 36 is a contact adapted to make contact with the armature 28 when the latter is attracted toward the pole 37 of the magnet 26. The contacts 33 and 36 are electrically connected to the conductor 23.

In operation when the generator 1 is at rest or rotating at such a low speed that its voltage is below that of the battery, a small current will pass through coil 17 in a direction to aid the spring 30 and maintain the armature relay switch 27 away from contact 33. Likewise this small current traversing the coil 18 on the other relay will flow therethrough in a direction to aid the spring 32 and tend to maintain the armature switch 28 away from contact 36. This causes the coil 16 to be open-circuited. When, however, the generator voltage slightly exceeds the battery voltage so that a current of predetermined value is sent through the coil 17 in the opposite direction, this causes the armature 27 to be attracted toward the pole 34 and make electrical contact with contact 33 thereby closing the circuit through the coil 9, the circuit being from one side of the generator through conductor 3, conductor 22, coil 9, conductor 23, contact 33, armature 27, conductor 38 and conductor 5 to the opposite side of the generator. This causes the main switch 8 to be closed whereupon a relatively heavy current flows through coil 18 from the generator to the battery in a direction to energize the armature 28 so that it will be attracted toward the pole 37 and make contact with contact 36. This also completes the circuit through coil 9 through contact 36, armature 28, coil 16, coil 18 and conductor 5 whereby the circuit through the coil 9 is maintained closed across the generator. As soon as the switch 8 is closed this substantially short-circuits the coil 17 whereupon the spring 30 acts to attract the armature 27 to its original position away from contact 33. As soon as the armature 28 makes contact with contact 36 the coil 16 is also energized and acts in a direction to aid the coil 18 to maintain the armature 28 in contact with contact 36.

When the generator voltage drops below that of the battery to a point where a predetermined current flows through coil 18 in a direction to oppose coil 16, then the armature 28 will be oppositely magnetized sufficiently to be attracted to the pole 31 and so open the circuit through coils 9 and 16 thus causing the main switch to open and the parts to be returned to the original position.

Referring to Fig. 3 the arrangement there shown is similar to that shown in Fig. 1 except for certain modifications in the relay switch apparatus, and there is also shown connected in series between the battery and the work circuit any suitable form of so-called lamp regulator or variable resistance 39. In Fig. 3 the relay apparatus is shown as having a fixed magnetic structure composed of a base portion 40 with three upright legs 41, 42 and 43. The coil 17, connected in series relation between the generator and battery and in shunt to the main switch 8 is wound about the leg 41 while the coil 18 connected in series with the generator and battery and in series with the switch 8 is wound upon the leg 43. A fine wire high resistance polarizing coil 44 is wound upon the leg 42, said coil being connected across the battery through conductors 45, 46, 47 and coil 18 and conductor 5. Pivoted to the upper end of the leg 42 is an armature 48, one end of which is adapted to be repelled from or attracted to the leg 41 and the other end of which is adapted to be attracted to or repelled from the leg 43. A spring 49 normally tends to pull one end of the armature away from the pole 41 and the other end thereof toward the pole 43. 50 represents a fixed electrical contact connected to the conductor 3. One end of the main switch coil 9 is connected to the conductor 5 while its other end is electrically connected to the pole 42 or armature 48 so that when the armature 48 makes electrical contact with the contact 50, the coil 9 is connected directly across the main circuit 3, 5.

In operation when the generator is at rest or running at a speed so low that the voltage of the generator is below that of the battery, the main switch 8 will be open thereby permitting the battery to send a small discharge current through the coil 18, coil 17 and generator 1. This causes the pole 43 to be magnetized in a direction to attract its end of the armature 48 and the coil 17 to be magnetized in a direction to repel its end of the armature 48 which armature is polarized by the action of coil 44 permanently connected across the battery. This repelling action by coil 17 and attractive action by coil 18 on the armature 48 is aided by the spring 49. When, however, the generator speed increases sufficiently so that its voltage is in excess of that of the battery sufficient to send a predetermined current in the opposite direction through the coils 17 and 18 the poles 41 and 43 become magnetized in the opposite directions respectively and to such an extent that one end of the armature 48 is attracted to the pole 41 and the opposite end of the armature 48 is repelled by pole 43, against the action of spring 49, so that the armature 48 makes electrical contact with fixed contact 50 thereby closing the circuit through coil 9 and causing the main switch 8 to be closed. This closing of the main switch substantially short-circuits the coil 17 whereby it becomes substantially deenergized but the closing of the main switch causes a heavier current to be sent through coil 18 from the generator to the battery or lamp circuit or both, which further magnetizes the pole 43 in a direction to more strongly repel the armature 48 against the action of spring 49 and so maintain the contact closed between fixed contact 50 and the armature 48. When, however, the generator voltage drops below that of the battery so that a predetermined current is sent from the battery through coil 18 and the generator in the opposite direction, then the pole 43 tends to attract the armature and aided by the spring 49 causes the armature to be attracted to pole 43, thus opening the circuit through contact 50 and the coil 9 and so deenergizing coil 9 and causing the main switch 8 to open. This removes the short circuit around coil 17 and returns the parts to their original position. The release spring 49 and the air gaps between the armature 48 and poles 41 and 43 are so adjusted that the armature will stick to the nearer pole in either position until reversed by current in the actuating coils 17 or 18 as the case may be. The arrows in Fig. 3 indicate the direction of current in various of the circuits and the direction of magnetization in the legs 41, 42 and 43 when the generator voltage is sufficiently above the battery voltage to result in the closing of the main switch 8. In the event of an open battery circuit the generator current will flow in a direction through the windings 17 and 44 in series to cause the circuit of coil 9 to be closed at contact 50, whereby under such conditions the main switch will be closed and the generator will still be kept connected to the work circuit.

It will be understood that in any of the arrangements shown in Figs. 1, 2 or 3, there may be included any suitable or well known form of regulating means to regulate the voltage of the generator.

While I have described my improvements in great detail and in connection with certain preferred forms, I do not desire to be limited to such details or forms since many changes and modifications may be made and the invention embodied in widely different forms without departing from the spirit and scope of the invention in its broader aspects. Therefore, I desire to cover all modifications and forms coming within the language or scope of any one or more of the appended claims.

What I claim as new and desire to secure by Letters Patent is:

1. An electrical system of distribution having in combination a generator, a storage battery connected to be charged thereby, a switch in circuit between the generator and battery for connecting and disconnecting the two, an electro-responsive coil for controlling the action of said switch, and a continuously polarized relay for controlling the energization of said coil, said relay having a coil connected in series between the generator and battery and in shunt to said switch.

2. An electrical system of distribution having in combination a generator, a storage battery connected to be charged thereby, a switch in circuit between the generator and battery for connecting and disconnecting the two, an electro-responsive coil for controlling the action of said switch, and continuously polarized relay apparatus for controlling the energization of said coil, said apparatus having a coil connected in series between the generator and battery and adapted to be short circuited by said switch, and a coil in series between the generator and battery and in series with said switch.

3. An electrical system of distribution having in combination a generator, a storage battery connected to be charged thereby, a switch in circuit between the generator and battery for connecting and disconnecting the two, an electro-responsive coil for controlling the action of said switch, and relay switch apparatus for controlling the energization of said coil, said relay switch apparatus having a continuously polarized member, a coil connected in series between the battery and generator and which coil is deenergized when the first switch is closed.

4. An electrical system of distribution having in combination a generator, a storage battery connected to be charged thereby, a switch in circuit between the generator and battery for connecting and disconnecting the two, an electro-responsive coil for controlling the action of said switch, and relay switch apparatus for controlling the energization of said coil, said relay switch apparatus having a continuously polarized armature, a coil connected in series between the battery and generator and adapted to be deenergized when the first switch is closed, and said apparatus also having a coil in series between the generator and battery and in series with said switch.

5. An electrical system of distribution having in combination a generator, a storage battery connected to be charged thereby, a switch in circuit between the generator and battery for connecting and disconnecting the two, an electro-responsive coil for controlling the action of said switch, and a relay switch for controlling said coil, said relay switch having a coil connected in series between the generator and battery and in shunt relation to said switch for causing the relay switch to be actuated to cause said first switch to be closed when the generator voltage exceeds the battery voltage.

6. An electrical system of distribution having in combination a generator, a storage battery connected to be charged thereby, a switch in circuit between the generator and battery for connecting and disconnecting the two, an electro-responsive coil for controlling the action of said switch, and a relay switch for causing said coil to be energized when the generator voltage exceeds the battery voltage, said relay switch having a coil connected in shunt relation to said first switch for causing the relay switch to cause said first coil to be energized said coil also being in series with a coil of said relay in series with said first switch.

7. An electrical system of distribution having in combination a generator, a storage battery connected to be charged thereby, a switch in circuit between the generator and the battery for connecting and disconnecting the two, electro-responsive means for controlling the action of said switch comprising a polarized relay, said relay having one element operable in one direction when the generator potential exceeds that of the battery and in another direction when the battery potential exceeds that of the generator, said relay having another element responsive to current through said switch and supplementing the action of said first element, and means operatively connected to said elements to close said switch when the generator potential exceeds that of the battery and to positively open said switch when current from the battery starts to flow therethrough substantially without regard to the magnitude of such current.

8. An electrical system of distribution having in combination a generator, a storage battery connected to be charged thereby, a switch in circuit between the generator and the battery for connecting and disconnecting the two, electro-responsive means for controlling the action of said switch comprising a polarized relay having two magnetic elements operatively connected to cooperate in opening or closing said switch respectively when the battery potential exceeds that of the generator or vice versa, one of said elements being sensitive to reversals of potential across said switch to control the actuation of said switch in one direction and the other element being sensitive to reversals of current passing through the switch and causing positive actuation of said switch in the other direction without regard to the magnitude of such current.

9. An electrical system of distribution having, in combination, a generator; a storage battery connected to be charged thereby; switching means in circuit between the generator and battery for connecting and disconnecting the two; and means for controlling the actuation of said switching means, said controlling means including a pivoted member, a coil for polarizing said pivoted member, a coil connected in shunt relation to said switching means and adapted, when said switching means is open, to act upon said polarized member to hold it in a position to prevent closing of said switching means when the battery voltage exceeds the generator voltage and to cause movement of said polarized member in a direction to effect closing of said switching means when the generator voltage exceeds the battery voltage, and a coil in series with said switching means and in series also with said first-mentioned coil when said switching means is open, said series coil acting, while said switching means is open, upon said polarized member to hold the latter in said first-mentioned position when the battery voltage exceeds the generator voltage, and acting to effect movement of said polarized member in a direction to effect closing of said switching means when the generator voltage exceeds that of the battery, and said series coil acting upon said polarized member, when said switching means is closed, to hold said member in its actuated position as long as the generator voltage exceeds that of the battery and to effect movement of said polarized member in a direction to effect opening of said switching means when the battery voltage exceeds that of the generator.

In testimony whereof I have signed my name to this specification.

ELI J. BLAKE.